(12) United States Patent
Nomaru (10) Patent No.: US 9,108,268 B2
(45) Date of Patent: Aug. 18, 2015

(54) LASER PROCESSING APPARATUS

(75) Inventor: Keiji Nomaru, Ota-Ku (JP)

(73) Assignee: Disco Corporation, Tokyo (JP)

( * ) Notice: Subject to any disclaimer, the term of this patent is extended or adjusted under 35 U.S.C. 154(b) by 372 days.

(21) Appl. No.: 13/494,745

(22) Filed: Jun. 12, 2012

(65) Prior Publication Data

US 2012/0312793 A1 Dec. 13, 2012

(30) Foreign Application Priority Data

Jun. 13, 2011 (JP) .................................. 2011-131338

(51) Int. Cl.
| | |
|---|---|
| B23K 26/08 | (2014.01) |
| B23K 26/00 | (2014.01) |
| B23K 26/04 | (2014.01) |
| B23K 26/06 | (2014.01) |

(52) U.S. Cl.
CPC ......... B23K 26/0042 (2013.01); B23K 26/0057 (2013.01); B23K 26/046 (2013.01); B23K 26/0648 (2013.01); B23K 26/0853 (2013.01)

(58) Field of Classification Search
USPC .............................. 219/121.6, 121.81, 121.76
See application file for complete search history.

(56) References Cited

U.S. PATENT DOCUMENTS

| | | | | |
|---|---|---|---|---|
| 3,458,829 | A * | 7/1969 | Pole et al. ........................ 372/24 |
| 4,727,234 | A * | 2/1988 | Oprysko et al. ........... 219/121.6 |
| 8,124,909 | B2 * | 2/2012 | Sawabe et al. ........... 219/121.67 |
| 8,319,143 | B2 * | 11/2012 | Nomaru ...................... 219/121.6 |
| 8,513,566 | B2 * | 8/2013 | Morikazu et al. .......... 219/121.7 |
| 8,563,893 | B2 * | 10/2013 | Kuno et al. .............. 219/121.68 |
| 8,610,028 | B2 * | 12/2013 | Kuno et al. .............. 219/121.67 |
| 2005/0211748 | A1 * | 9/2005 | Mizuyama et al. ........... 228/101 |
| 2007/0158314 | A1 * | 7/2007 | Fukumitsu et al. ........ 219/121.6 |
| 2008/0019015 | A1 * | 1/2008 | Fernandez et al. ............ 359/666 |

(Continued)

FOREIGN PATENT DOCUMENTS

| | | |
|---|---|---|
| JP | 2002-239769 | 8/2002 |
| JP | 2004-337902 | 12/2004 |

(Continued)

OTHER PUBLICATIONS

Mermillod-Blondin et al., "High-speed verifocal imaging with a tunable acoustic gradient index of refraction lens," Optics Letters, vol. 33, No. 18, Sep. 15, 2008, pp. 2146-2148.

*Primary Examiner* — Dana Ross
*Assistant Examiner* — Renee L Miller
(74) *Attorney, Agent, or Firm* — Greer Burns & Crain Ltd.

(57) ABSTRACT

A laser processing apparatus including a pulsed laser oscillator for oscillating a pulsed laser beam, a focusing objective lens for focusing the pulsed laser beam, and a varifocal lens provided between the pulsed laser oscillator and the focusing objective lens. The varifocal lens has a piezoelectric device to change its focal length according to the period of radio-frequency waves produced by the piezoelectric device. A repetition frequency adjusting unit is connected to the pulsed laser oscillator, and a radio-frequency current frequency adjusting unit is connected to the piezoelectric device. The laser processing apparatus further includes a controller for controlling the repetition frequency adjusting unit and the radio-frequency current frequency adjusting unit so as to produce a phase difference between the repetition frequency of the pulsed laser beam and the frequency of the radio-frequency current to be applied to the piezoelectric device of the varifocal lens.

2 Claims, 7 Drawing Sheets

(56) References Cited

U.S. PATENT DOCUMENTS

| | | | |
|---|---|---|---|
| 2008/0105662 A1* | 5/2008 | Shigematsu et al. | 219/121.67 |
| 2009/0266802 A1* | 10/2009 | Sawabe et al. | 219/121.67 |
| 2010/0301024 A1* | 12/2010 | Unrath | 219/121.67 |

FOREIGN PATENT DOCUMENTS

| | | |
|---|---|---|
| JP | 2004-337903 | 12/2004 |
| JP | 2006-131443 | 5/2006 |

* cited by examiner

LASER PROCESSING APPARATUS

BACKGROUND OF THE INVENTION

1. Field of the Invention

The present invention relates to a laser processing apparatus for applying a pulsed laser beam having a transmission wavelength to a workpiece to thereby form a modified layer inside the workpiece.

2. Description of the Related Art

In a semiconductor device fabrication process, a plurality of crossing division lines called streets are formed on the front side of a wafer including a suitable substrate such as a silicon substrate, sapphire substrate, silicon carbide substrate, lithium tantalate substrate, glass substrate, and quartz substrate to thereby partition a plurality of regions where devices (functional devices) such as ICs and LSIs are respectively formed. The wafer is cut along the streets to thereby divide the regions where the devices are formed from each other, thus obtaining the individual devices.

As a method of dividing the wafer along the streets, there has been tried a laser processing method using a pulsed laser beam having a transmission wavelength to the wafer to apply the pulsed laser beam to the wafer in the condition where the focal point of the pulsed laser beam is set inside the wafer in its subject area to be divided. In such a dividing method using this laser processing method, a pulsed laser beam having a transmission wavelength (e.g., 1064 nm) to the wafer is applied to the wafer from one side thereof in the condition where the focal point of the pulsed laser beam is set inside the wafer, thereby continuously forming a modified layer inside the wafer along each street. Thereafter, an external force is applied to the wafer along each street where the modified layer is formed to be reduced in strength, thereby dividing the wafer along each street.

The thickness of the modified layer formed inside the wafer by this laser processing is about 20 to 30 µm in the vicinity of the focal point of the pulsed laser beam. Accordingly, in the case that the thickness of the wafer is 200 µm, for example, four to five layers must be stacked to obtain a desired thickness of the modified layer. To this end, the focal point of the pulsed laser beam must be displaced in the direction along the thickness of the wafer, and the relative movement of the pulsed laser beam and the wafer along each street must be repeated four to five times, thus requiring a long time. To solve this problem, there has been proposed a laser processing apparatus configured so that a pulsed laser beam is focused at two focal points displaced from each other on the optical axis of a focusing lens to thereby simultaneously form two modified layers at different depths along each street. This laser processing apparatus is disclosed in Japanese Patent Laid-open Nos. 2004-337902 and 2004-337903.

SUMMARY OF THE INVENTION

However, the technique described in Japanese Patent Laid-open No. 2004-337902 has a problem such that the configuration of the laser processing apparatus is complicated, and the technique described in Japanese Patent Laid-open No. 2004-337903 also has a problem such that two laser light sources are required to cause an increase in cost.

It is therefore an object of the present invention to provide a laser processing apparatus which can form a modified layer having a variable thickness without complication of the configuration.

In accordance with an aspect of the present invention, there is provided a laser processing apparatus including a chuck table for holding a workpiece; laser beam applying means for applying a pulsed laser beam to the workpiece held on the chuck table, the laser beam applying means having a pulsed laser oscillator for oscillating a pulsed laser beam, repetition frequency adjusting means for adjusting the repetition frequency of the pulsed laser beam to be oscillated by the pulsed laser oscillator, and a focusing objective lens for focusing the pulsed laser beam oscillated by the pulsed laser oscillator onto the workpiece held on the chuck table; a varifocal lens provided between the pulsed laser oscillator and the focusing objective lens, the varifocal lens having a piezoelectric device to change its focal length according to the period of radio-frequency waves produced by the piezoelectric device; radio-frequency current frequency adjusting means for adjusting the frequency of a radio-frequency current to be applied to the piezoelectric device; and control means for controlling the repetition frequency adjusting means and the radio-frequency current frequency adjusting means; the control means controlling the repetition frequency adjusting means and the radio-frequency current frequency adjusting means so as to produce a phase difference between the repetition frequency of the pulsed laser beam to be oscillated by the pulsed laser oscillator and the frequency of the radio-frequency current to be applied to the piezoelectric device of the varifocal lens.

Preferably, the varifocal lens includes a first varifocal lens and a second varifocal lens on the same optical axis, each of the first and second varifocal lenses having a piezoelectric device; and the control means controls the radio-frequency current frequency adjusting means so as to produce a phase difference of 180° between a radio-frequency current to be applied to the piezoelectric device of the first varifocal lens and a radio-frequency current to be applied to the piezoelectric device of the second varifocal lens.

The laser processing apparatus according to the present invention includes the varifocal lens provided between the pulsed laser oscillator and the focusing objective lens. The pulsed laser oscillator oscillates a pulsed laser beam having a repetition frequency set by the repetition frequency adjusting means. The varifocal lens includes a piezoelectric device for producing radio-frequency waves. The focal length of the varifocal lens is changed according to the period of the radio-frequency waves (ultrasonic waves) produced by the piezoelectric device. The laser processing apparatus further includes the radio-frequency current frequency adjusting means for adjusting the frequency of a radio-frequency current to be applied to the piezoelectric device and the control means for controlling the repetition frequency adjusting means and the radio-frequency current frequency adjusting means. The control means controls the repetition frequency adjusting means and the radio-frequency current frequency adjusting means so as to produce a phase difference between the repetition frequency of the pulsed laser beam to be oscillated by the pulsed laser oscillator and the frequency of the radio-frequency current to be applied to the piezoelectric device of the varifocal lens. Accordingly, the focal point of the pulsed laser beam applied from the focusing objective lens can be displaced on the optical axis of the focusing objective lens. As a result, a modified layer having a desired thickness can be formed inside the workpiece by once scanning the pulsed laser beam.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
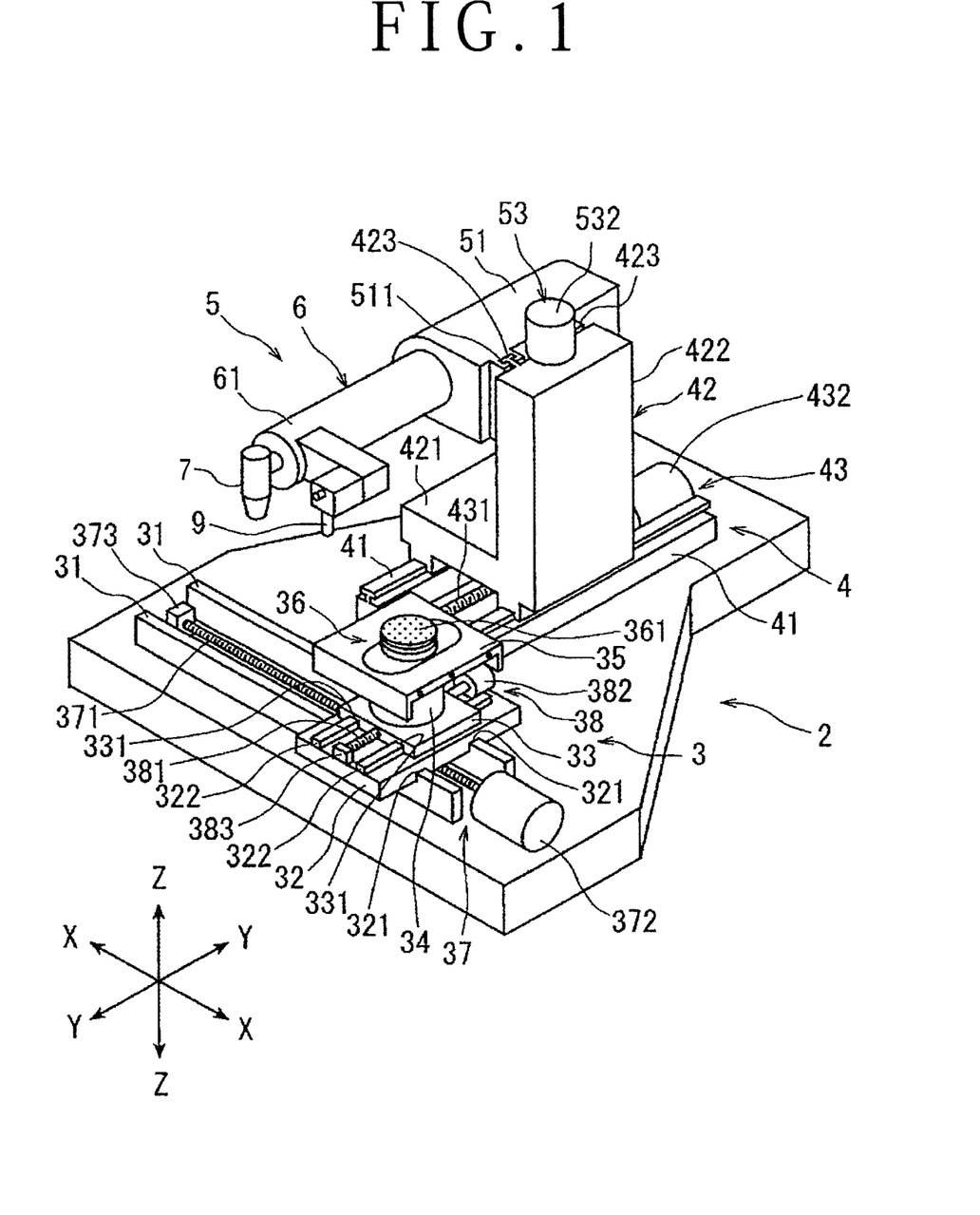
FIG. 1 is a perspective view of a laser processing apparatus according to the present invention.

A preferred embodiment of the laser processing apparatus according to the present invention will now be described in detail with reference to the attached drawings. FIG. 1 is a perspective view of a laser processing apparatus according to a preferred embodiment of the present invention. The laser processing apparatus shown in FIG. 1 includes a stationary base 2, chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31, 31 provided on the stationary base 2 so as to extend parallel to each other in the X direction, a first slide block 32 provided on the guide rails 31, 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a workpiece holding surface 361 formed of a porous material. A wafer as a workpiece is adapted to be held under suction on the workpiece holding surface 361 of the chuck table 36 by operating suction means (not shown). The chuck table 36 is rotatable by a pulse motor (not shown) provided in the cylindrical member 34.

The lower surface of the first slide block 32 is formed with a pair of guided grooves 321, 321 for slidably engaging the pair of guide rails 31, 31 mentioned above. A pair of guide rails 322, 322 are provided on the upper surface of the first slide block 32 so as to extend parallel to each other in the Y direction. Accordingly, the first slide block 32 is movable in the X direction along the guide rails 31, 31 by the slidable engagement of the guided grooves 321, 321 with the guide rails 31, 31. The chuck table mechanism 3 further includes feeding means 37 for moving the first slide block 32 in the X direction along the guide rails 31, 31. The feeding means 37 includes an externally threaded rod 371 extending parallel to the guide rails 31, 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31, 31 by operating the pulse motor 372 to normally or reversely rotate the externally threaded rod 371.

The lower surface of the second slide block 33 is formed with a pair of guided grooves 331, 331 for slidably engaging the pair of guide rails 322, 322 provided on the upper surface of the first slide block 32 as mentioned above. Accordingly, the second slide block 33 is movable in the Y direction along the guide rails 322, 322 by the slidable engagement of the guided grooves 331, 331 with the guide rails 322, 322. The chuck table mechanism 3 further includes first indexing means 38 for moving the second slide block 33 in the Y direction along the guide rails 322, 322. The first indexing means 38 includes an externally threaded rod 381 extending parallel to the guide rails 322, 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322, 322 by operating the pulse motor 382 to normally or reversely rotate the externally threaded rod 381.

The laser beam applying unit supporting mechanism 4 includes a pair of guide rails 41, 41 provided on the stationary base 2 so as to extend parallel to each other in the Y direction and a movable support base 42 provided on the guide rails 41, 41 so as to be movable in the Y direction. The movable support base 42 is composed of a horizontal portion 421 slidably supported to the guide rails 41, 41 and a vertical portion 422 extending vertically upward from the upper surface of the horizontal portion 421. Further, a pair of guide rails 423, 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41, 41. The second indexing means 43 includes an externally threaded rod 431 extending parallel to the guide rails 41, 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41, 41 by operating the pulse motor 432 to normally or reversely rotate the externally threaded rod 431.

The laser beam applying unit 5 includes a unit holder 51 and laser beam applying means 6 mounted to the unit holder 51. The unit holder 51 is formed with a pair of guided grooves 511, 511 for slidably engaging the pair of guide rails 423, 423 provided on the vertical portion 422 of the movable support base 42. Accordingly, the unit holder 51 is supported to the movable support base 42 so as to be movable in the Z direction by the slidable engagement of the guided grooves 511, 511 with the guide rails 423, 423.

The laser beam applying unit 5 further includes focal position adjusting means 53 for moving the unit holder 51 along the guide rails 423, 423 in the Z direction. The focal position adjusting means 53 includes an externally threaded rod (not shown) extending parallel to the guide rails 423, 423 so as to be interposed therebetween and a pulse motor 532 as a drive source for rotationally driving this externally threaded rod. Accordingly, the unit holder 51 and the laser beam applying means 6 are moved in the Z direction along the guide rails 423, 423 by operating the pulse motor 532 to normally or reversely rotate this externally threaded rod. In this preferred embodiment, when the pulse motor 532 is normally operated, the laser beam applying means 6 is moved upward, whereas when the pulse motor 532 is reversely operated, the laser beam applying means 6 is moved downward.

Figure 2:
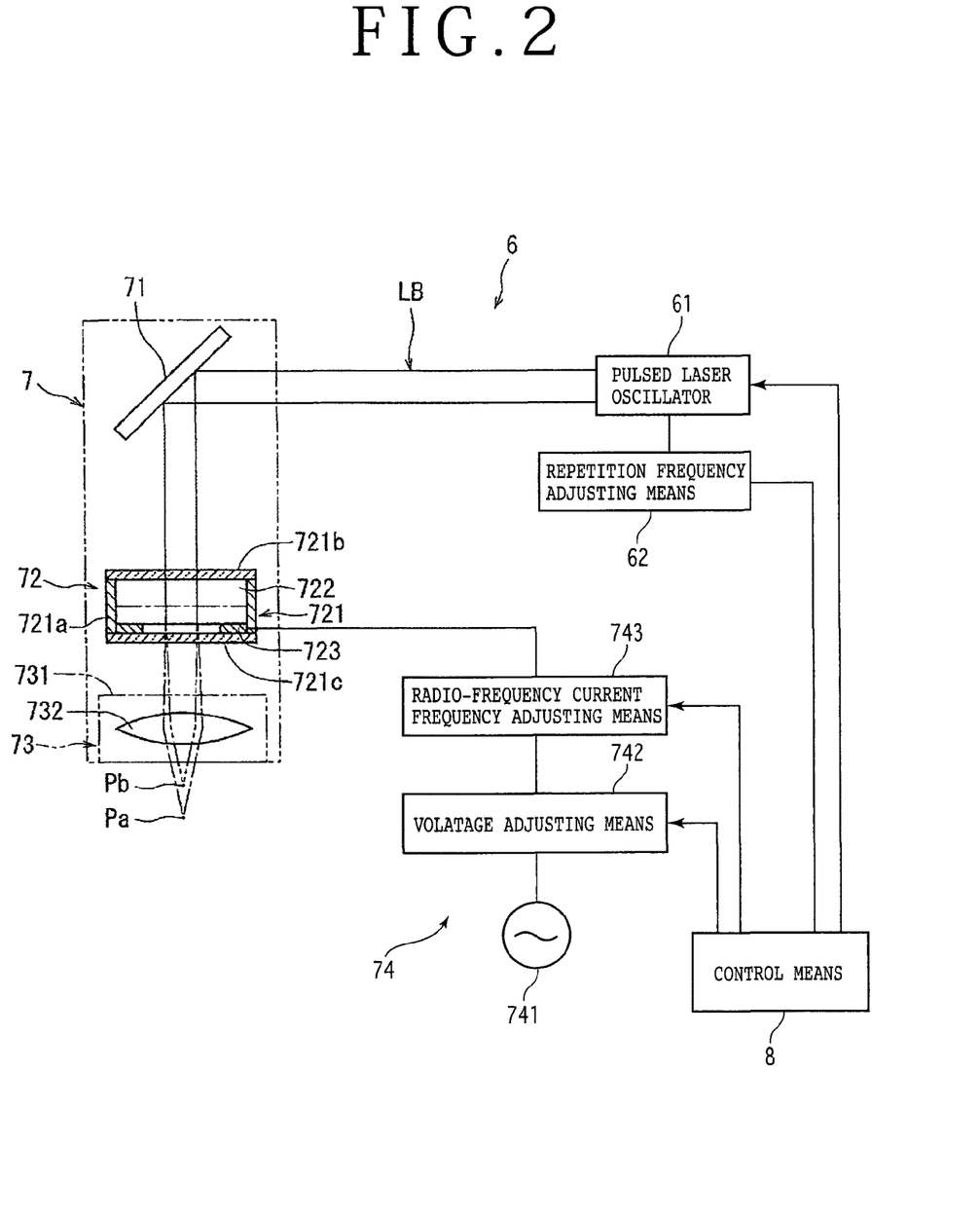
FIG. 2 is a schematic block diagram showing the configuration of laser beam applying means included in the laser processing apparatus shown in FIG. 1.

The laser beam applying means 6 includes a cylindrical pulsed laser oscillator 61 fixed to the unit holder 51 so as to extend in a substantially horizontal direction. As shown in FIG. 2, the laser beam applying means 6 includes the pulsed laser oscillator 61 for oscillating a pulsed laser beam, repetition frequency adjusting means 62 for adjusting the repetition frequency of the pulsed laser beam to be oscillated by the pulsed laser oscillator 61, and a processing head 7 for focusing the pulsed laser beam oscillated by the pulsed laser oscillator 61 onto the workpiece held on the chuck table 36. The pulsed laser oscillator 61 is provided by a YAG laser oscillator or a YVO4 laser oscillator, for example, and oscillates a pulsed laser beam having a transmission wavelength (e.g., 1064 nm) to the workpiece held on the chuck table 36. The repetition frequency adjusting means 62 is controlled by control means to be hereinafter described and adjusts the repetition frequency of the pulsed laser beam to be oscillated by the pulsed laser oscillator 61.

The processing head 7 includes a direction changing mirror 71 for changing the traveling direction of the pulsed laser beam oscillated by the pulsed laser oscillator 61 toward the workpiece holding surface 361 (see FIG. 1) of the chuck table 36, a varifocal lens 72 having a variable focal length varying according to the period of a radio-frequency signal applied, and focusing means 73 for focusing the pulsed laser beam passed through the varifocal lens 72 onto the workpiece held on the chuck table 36. The varifocal lens 72 is composed of a lens case 721, a lens liquid 722 sealed in the lens case 721, and an annular piezoelectric device 723 for giving radio-frequency waves to the lens liquid 722. The lens case 721 is composed of a cylindrical case body 721a and a pair of upper and lower circular transparent members 721b and 721c for closing the upper and lower ends of the cylindrical case body 721a. The transparent members 721b and 721c are formed of glass, for example. The lens liquid 722 is sealed in the lens case 721 and the piezoelectric device 723 is provided in the lens case 721 so as to come into contact with the lens liquid 722. When a radio-frequency current is applied to the piezoelectric device 723, the piezoelectric device 723 gives radio-frequency waves to the lens liquid 722, thereby changing the refractive index of the lens liquid 722. That is, at the valley portion of the radio-frequency waves, the lens liquid 722 functions as a concave lens, whereas at the peak portion of the radio-frequency waves, the lens liquid 722 functions as a convex lens, thereby changing the focal length of the lens liquid 722 according to the period of the radio-frequency waves given. Such a varifocal lens 72 has been developed by Professor Craig Arnold at Princeton University in the U.S., and the details of its principle are described in the following paper.

"High-speed varifocal imaging with a tunable acoustic gradient index of refraction lens," Alexandre Mermillod-Brollondin, Euan McLeod, and Craig B. Arnold, Opt. Lett., 33, 2146 (2008).

The focusing means 73 is composed of a case 731 and a focusing objective lens 732 provided in the case 731 for focusing the pulsed laser beam passed through the varifocal lens 72 onto the workpiece held on the chuck table 36.

The laser beam applying means 6 further includes radio-frequency current applying means 74 for applying a radio-frequency current to the piezoelectric device 723 constituting the varifocal lens 72. The radio-frequency current applying means 74 includes an AC power supply 741 for supplying a radio-frequency current, voltage adjusting means 742 for adjusting the voltage of the radio-frequency current supplied from the AC power supply 741, and radio-frequency current frequency adjusting means 743 for adjusting the frequency of the radio-frequency current whose voltage has been adjusted by the voltage adjusting means 742. As described later, the radio-frequency current controlled in voltage and frequency is applied to the piezoelectric device 723. The laser beam applying means 6 further includes control means 8 for controlling the pulsed laser oscillator 61, the repetition frequency adjusting means 62, the voltage adjusting means 742, and the radio-frequency current frequency adjusting means 743.

Figure 3:
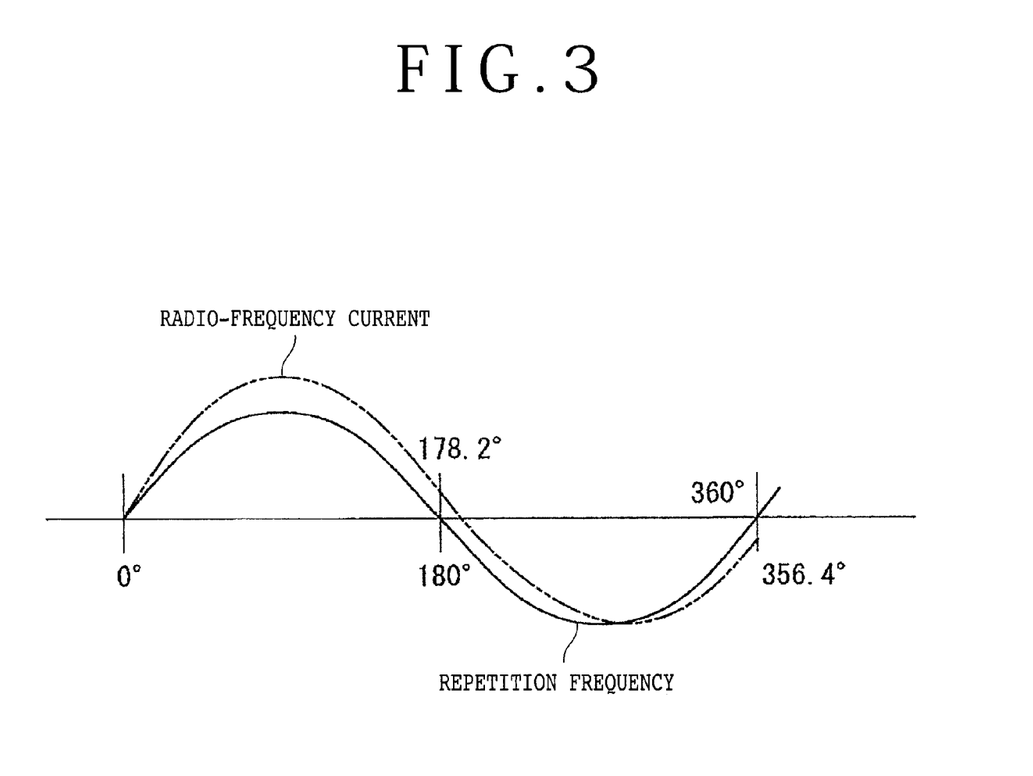
FIG. 3 is a schematic diagram showing the relation between the repetition frequency of a pulsed laser beam to be oscillated by a pulsed laser oscillator constituting the laser beam applying means shown in FIG. 2 and the frequency of a radio-frequency current to be applied to a piezoelectric device constituting a varifocal lens in this laser beam applying means.

The operation of the laser beam applying means 6 having the above configuration shown in FIG. 2 will now be described. The control means 8 outputs a control signal to the repetition frequency adjusting means 62 so that the repetition frequency of the pulsed laser beam to be oscillated by the pulsed laser oscillator 61 is adjusted to 100 kHz, for example. The control means 8 further outputs a control signal to the radio-frequency current frequency adjusting means 743 so that the frequency of the radio-frequency current to be applied to the piezoelectric device 723 of the varifocal lens 72 by the radio-frequency current applying means 74 is adjusted to 99 kHz, for example. As a result, the pulsed laser beam having a repetition frequency of 100 kHz is oscillated by the pulsed laser oscillator 61, and the radio-frequency current having a frequency of 99 kHa is applied to the piezoelectric device 723 of the varifocal lens 72. Accordingly, as shown in FIG. 3, a phase difference is produced between the repetition frequency of the pulsed laser beam incident on the varifocal lens 72 and the frequency of the radio-frequency waves given to the lens liquid 722 by the piezoelectric device 723. In the above case, this phase difference becomes 3.6° in one cycle. [The phase difference=360°−(radio-frequency current frequency/repetition frequency)×360°=360°−(99 kHz/100 kHz)×360°=360°−356.4°=3.6°].

As described above, the repetition frequency of the pulsed laser beam to be oscillated by the pulsed laser oscillator 61 is set to 100 kHz, and the frequency of the radio-frequency current to be applied to the piezoelectric device 723 of the varifocal lens 72 is set to 99 kHz. In this condition, the pulsed laser beam is oscillated by the pulsed laser oscillator 61. As shown in FIG. 2, the pulsed laser beam LB oscillated by the pulsed laser oscillator 61 is reflected by the direction changing mirror 71 to enter the varifocal lens 72. The pulsed laser beam LB incident on the varifocal lens 72 is passed through the lens liquid 722 of the varifocal lens 72. At this time, the radio-frequency waves corresponding to the frequency of the radio-frequency current applied to the piezoelectric device 723 are given to the lens liquid 722. Accordingly, the pulsed laser beam LB passing through the lens liquid 722 is refracted as shown by a single dot & dash line in FIG. 2 in the valley portion of the radio-frequency waves given to the lens liquid 722, whereas the pulsed laser beam LB is refracted as shown by a double dot & dash line in FIG. 2 in the peak portion of the radio-frequency waves given to the lens liquid 722.

Accordingly, the pulsed laser beam refracted by the varifocal lens 72 as shown by the single dot & dash line is focused at a focal point Pa by the focusing objective lens 732. On the other hand, the pulsed laser beam refracted by the varifocal lens 72 as shown by the double dot & dash line is focused at a focal point Pb by the focusing objective lens 732. As described above, there is a phase difference (3.6° in this preferred embodiment) between the repetition frequency of the pulsed laser beam LB and the frequency of the radio-frequency waves given to the lens liquid 722 by the piezoelectric device 723. Accordingly, the focal points Pa and Pb are displaced on the optical axis of the varifocal lens 72 according to the condition of the radio-frequency waves given to the lens liquid 722 at the time the pulses of the pulsed laser beam LB are passed through the lens liquid 722. The maximum gap between the focal points Pa and Pb can be adjusted by adjusting the voltage of the radio-frequency current to be applied to the piezoelectric device 723 to thereby change the amplitude of ultrasonic waves (radio-frequency waves) to be given to the lens liquid 722.

Figure 4:
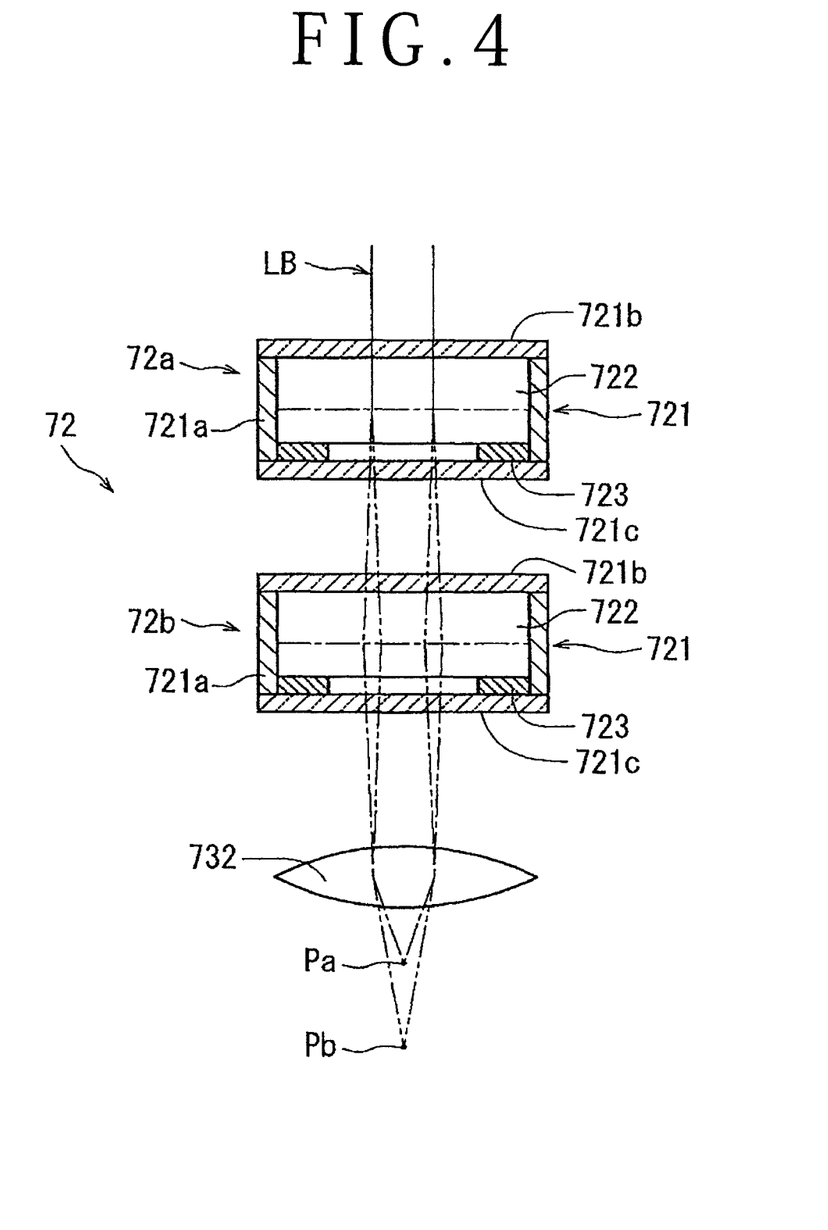
FIG. 4 is a schematic diagram showing a modification of the varifocal lens in the laser beam applying means shown in FIG. 2.

A modification of the varifocal lens 72 will now be described with reference to FIG. 4. The varifocal lens 72 shown in FIG. 4 is composed of a first varifocal lens 72a and a second varifocal lens 72b. The first varifocal lens 72a is provided on the entrance side (the pulsed laser oscillator 61 side) and the second varifocal lens 72b is provided on the emergence side (the focusing means 73 side). Each of the first and second varifocal lenses 72a and 72b is substantially the same in configuration as the varifocal lens 72 shown in FIG. 2, so the same members are denoted by the same reference numerals and the description thereof will be omitted herein.

In the varifocal lens 72 shown in FIG. 4, the radio-frequency current to be applied to the piezoelectric device 723 of the first varifocal lens 72a and the radio-frequency current to be applied to the piezoelectric device 723 of the second varifocal lens 72b are controlled to have opposite phases (a phase difference of 180°). Accordingly, when the first varifocal lens 72a functions as a concave lens, the second varifocal lens 72b functions as a convex lens. Conversely, when the first varifocal lens 72a functions as a convex lens, the second varifocal lens 72b functions as a concave lens. In the case that the first varifocal lens 72a functions as a concave lens and the second varifocal lens 72b functions as a convex lens, the pulsed laser beam LB incident on the varifocal lens 72 composed of the first and second varifocal lenses 72a and 72b is refracted as shown by a single dot & dash line in FIG. 4 to enter the focusing objective lens 732 and then focused at a focal point Pa by the focusing objective lens 732 as shown in FIG. 4. Conversely, in the case that the first varifocal lens 72a functions as a convex lens and the second varifocal lens 72b functions as a concave lens, the pulsed laser beam LB is refracted as shown by a double dot & dash line in FIG. 4 to enter the focusing objective lens 732 and then focused at a focal point Pb by the focusing objective lens 732 as shown in FIG. 4.

As described above, in the varifocal lens 72 shown in FIG. 4, the radio-frequency current to be applied to the piezoelectric device 723 of the first varifocal lens 72a and the radio-frequency current to be applied to the piezoelectric device 723 of the second varifocal lens 72b are controlled to have opposite phases (a phase difference of 180°). Further, by controlling the voltage of the radio-frequency current to be applied to the piezoelectric device 723 of the first varifocal lens 72a and the voltage of the radio-frequency current to be applied to the piezoelectric device 723 of the second varifocal lens 72b to make the refractive index of the second varifocal lens 72b be twice, for example, the refractive index of the first varifocal lens 72a, the beam size of the pulsed laser beam incident on the focusing objective lens 722 through the first and second varifocal lenses 72a and 72b can be made constant. In performing laser processing by applying a pulsed laser beam to a workpiece in the condition where the focal point of the pulsed laser beam is set inside the workpiece to thereby form a modified layer inside the workpiece, it is important to maintain a uniform energy of the pulsed laser beam incident on a focusing objective lens. It is therefore desirable to make the beam size of the pulsed laser beam incident on the focusing objective lens be as constant as possible. In the varifocal lens 72 shown in FIG. 4, the beam size of the pulsed laser beam incident on the focusing objective lens 732 can be made constant as described above. Accordingly, the pulsed laser beam incident on the focusing objective lens 732 does not largely change in NA, so that only the focal positions can be changed.

Referring back to FIG. 1, imaging means 9 for detecting a subject area of the workpiece to be laser-processed by the laser beam applying means 6 is provided at the front end portion of the pulsed laser oscillator 61 constituting the laser beam applying means 6. The imaging means 9 includes an ordinary imaging device (CCD) for imaging the workpiece by using visible light, infrared light applying means for applying infrared light to the workpiece, an optical system for capturing the infrared light applied to the workpiece by the infrared light applying means, and an imaging device (infrared CCD) for outputting an electrical signal corresponding to the infrared light captured by the optical system. An image signal output from the imaging means 9 is transmitted to the control means 8.

Figure 5:
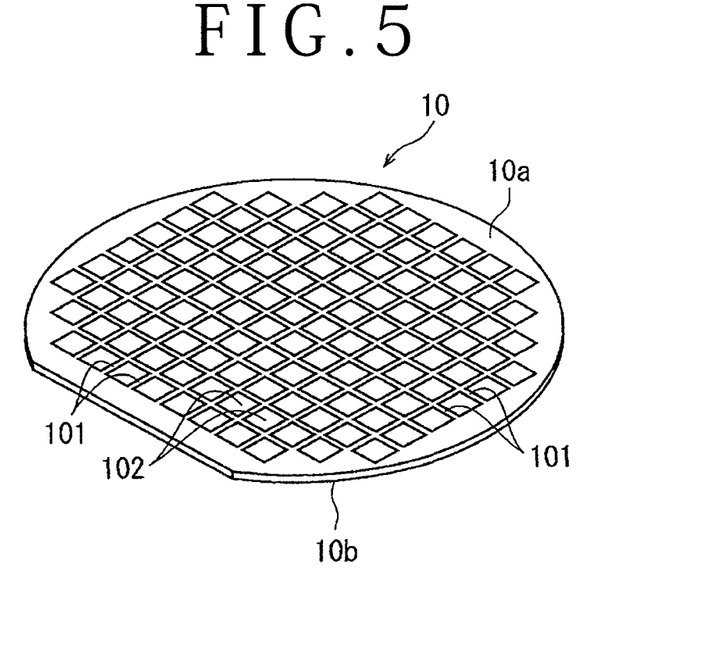
FIG. 5 is a perspective view of a semiconductor wafer as a workpiece to be processed by the laser processing apparatus shown in FIG. 1.
Figure 6:
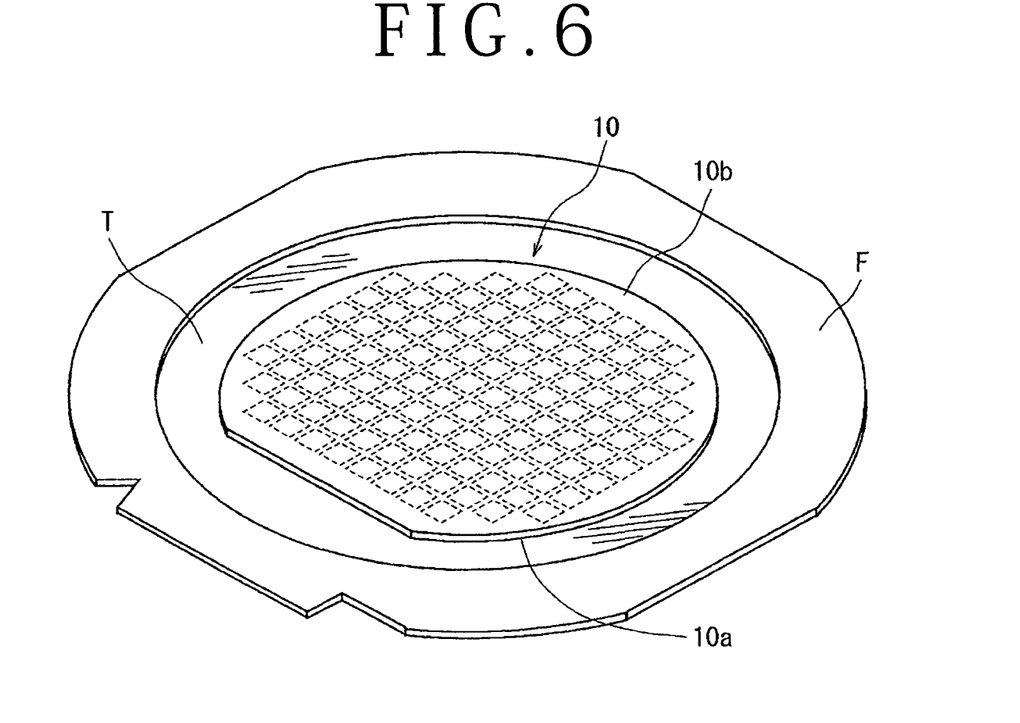
FIG. 6 is a perspective view showing a condition where the semiconductor wafer shown in FIG. 5 is attached to a protective tape supported to an annular frame.

The operation of the laser processing apparatus configured above will now be described. FIG. 5 is a perspective view of a semiconductor wafer 10 as the workpiece. The semiconductor wafer 10 shown in FIG. 5 is formed from a silicon wafer having a thickness of 200 μm, for example. The semiconductor wafer 10 has a front side 10a and a back side 10b. A plurality of crossing streets 101 are formed on the front side 10a of the wafer 10, thereby partitioning a plurality of rectangular regions where a plurality of devices 102 such as ICs and LSIs are respectively formed. As shown in FIG. 6, the front side 10a of the wafer 10 is attached to a protective tape T supported to an annular frame F (protective tape attaching step). The protective tape T is formed from a synthetic resin sheet such as a polyolefin sheet. Accordingly, the back side 10b of the wafer 10 attached to the protective tape T is oriented upward.

After performing the protective tape attaching step mentioned above, the wafer 10 supported through the protective tape T to the annular frame F is placed on the chuck table 36 of the laser processing apparatus shown in FIG. 1 in the condition where the protective tape T comes into contact with the upper surface of the chuck table 36. Thereafter, the suction means is operated to hold the wafer 10 through the protective tape T on the chuck table 36 under suction (wafer holding step). Accordingly, the wafer 10 is held on the chuck table 36 in the condition where the back side 10b of the wafer 10 is oriented upward.

After performing the wafer holding step mentioned above, the feeding means 37 is operated to move the chuck table 36 holding the wafer 10 to a position directly below the imaging means 9. In the condition where the chuck table 36 is positioned directly below the imaging means 9, an alignment operation is performed by the imaging means 9 and the control means 8 to detect a subject area of the wafer 10 to be laser-processed. More specifically, the imaging means 9 and the control means 8 perform image processing such as pattern matching for making the alignment of the streets 101 extending in a first direction on the wafer 10 and the focusing objective lens 732 of the focusing means 73 constituting the laser beam applying means 6 for applying the laser beam along the streets 101, thereby performing the alignment of a laser beam applying position. This alignment operation is performed similarly for the other streets 101 extending in a second direction perpendicular to the first direction mentioned above on the wafer 10. Although the front side 10a on which the streets 101 of the wafer 10 are formed is oriented downward, the streets 101 can be imaged from the back side 10b through the wafer 10 because the imaging means 9 includes the infrared light applying means for applying infrared, the optical system for capturing the infrared light, and the imaging device (infrared CCD) for outputting an electrical signal corresponding to the infrared light.

Figure 7A:
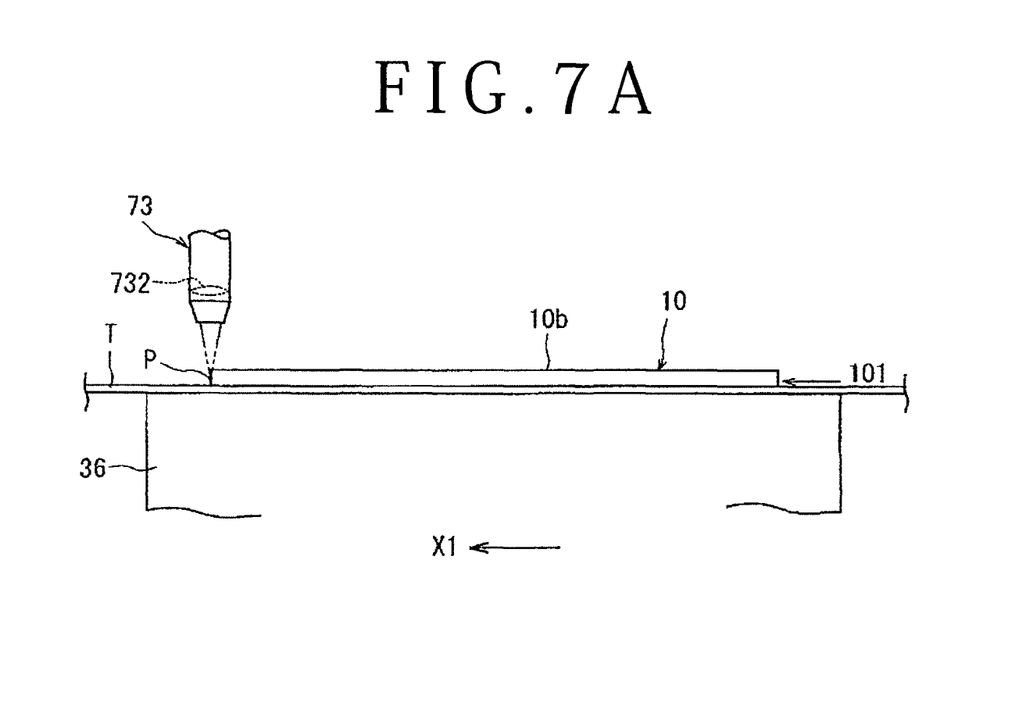
FIGS. 7A and 7B are sectional side views for illustrating a modified layer forming step performed by the laser processing apparatus shown in FIG. 1.

After performing the alignment operation to detect all of the crossing streets 101 extending in the first and second directions on the wafer 10 held on the chuck table 36, the chuck table 36 is moved to position one end (left end as viewed in FIG. 7A) of a predetermined one of the streets 101 extending in the first direction directly below the focusing means 73 as shown in FIG. 7A. Thereafter, the focal point P of the pulsed laser beam to be applied through the focusing objective lens 732 of the focusing means 73 is set near the center of the thickness of the wafer 10.

Figure 7B:
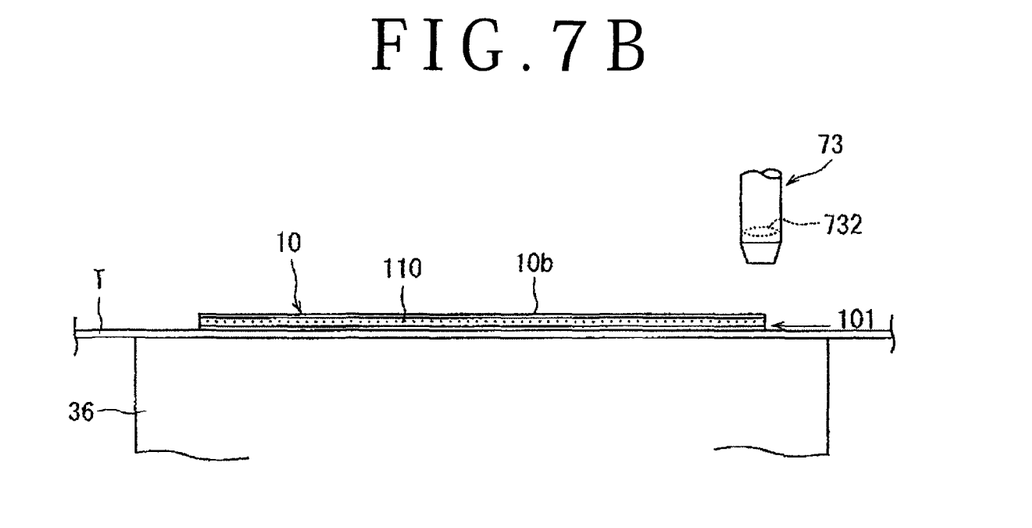

Thereafter, the laser beam applying means 6 is operated to apply the pulsed laser beam from the focusing means 73 to the subject area of the wafer 10. Further, the chuck table 36 is moved in the direction shown by an arrow X1 in FIG. 7A at a predetermined feed speed (modified layer forming step). When the other end (right end as viewed in FIG. 7B) of the predetermined street 101 reaches the position directly below the focusing means 73 as shown in FIG. 7B, the application of the pulsed laser beam is stopped and the movement of the chuck table 36 is also stopped. As a result, a modified layer 110 having a predetermined thickness is formed inside the wafer 10 along the predetermined street 101 as shown in FIG. 7B.

Figure 8:
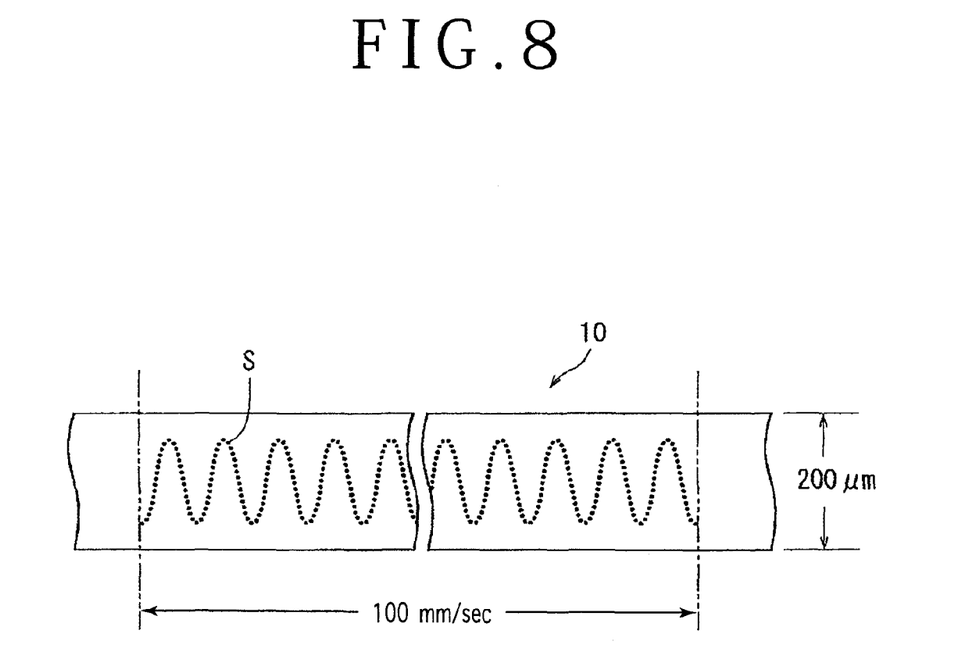
FIG. 8 is a schematic enlarged view showing a modified layer formed inside the semiconductor wafer by the modified layer forming step shown in FIGS. 7A and 7B.

For example, the modified layer forming step mentioned above is performed under the following processing conditions.
Wavelength of the pulsed laser beam: 1064 nm
Power: 1 W
Repetition frequency: 100 kHz
Frequency of the radio-frequency current to be applied to the piezoelectric device of the varifocal lens: 99 kHz
Focused spot diameter: 10 μm
Work feed speed: 100 mm/sec As described above, the focal point of the pulsed laser beam oscillated by the pulsed laser oscillator 61 and focused by the focusing objective lens 732 through the varifocal lens 72 is displaced on the optical axis of the focusing objective lens 732. Accordingly, when the wafer 10 as the workpiece is moved at a feed speed of 100 mm/sec, one peak portion is formed by the spots (S) of 100 pulses inside the wafer 10 as shown in FIG. 8 and 1000 peak portions each having the 100 spots (S) are formed in the distance of 100 mm/sec. Accordingly, the modified layer 110 having a predetermined thickness (t) is formed inside the wafer 10 along the predetermined street 101 as shown in FIG. 8. This thickness (t) of the modified layer 110 can be changed by adjusting the voltage of the radio-frequency current to be applied to the piezoelectric device 723 of the varifocal lens 72. Thus, in the laser processing apparatus according to this preferred embodiment, the modified layer 110 having a desired thickness (e.g., 50 to 200 μm) can be formed inside the wafer 10 by once scanning the pulsed laser beam.

After performing the modified layer forming step along all of the streets 101 extending in the first direction on the wafer 10, the chuck table 36 holding the wafer 10 is rotated 90° to similarly perform the modified layer forming step along all of the other streets 101 extending in the second direction perpendicular to the first direction on the wafer 10. Thereafter, the wafer 10 is transported to a position where a wafer dividing step is performed in such a manner that an external force is applied to the wafer 10 to thereby break the wafer 10 along the streets 101 where the modified layers 110 are formed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
a chuck table for holding a workpiece;
a laser beam applier for applying a pulsed laser beam to said workpiece held on said chuck table, said laser beam applying means including a pulsed laser oscillator for oscillating the pulsed laser beam, a repetition frequency adjuster for adjusting the repetition frequency of said pulsed laser beam to be oscillated by said pulsed laser oscillator, and an objective lens focuser for focusing said pulsed laser beam oscillated by said pulsed laser oscillator onto said workpiece held on said chuck table;
a varifocal lens provided between said pulsed laser oscillator and said focusing objective lens, said varifocal lens having a piezoelectric device to change its focal length according to the period of radio-frequency waves produced by said piezoelectric device;
radio-frequency current frequency adjuster for adjusting the frequency of a radio-frequency current to be applied to said piezoelectric device; and
a controller for controlling said repetition frequency adjuster and said radio-frequency current frequency adjuster;

said controller controlling said repetition frequency adjuster and said radio-frequency current frequency adjuster so as to produce a phase difference between the repetition frequency of said pulsed laser beam to be oscillated by said pulsed laser oscillator and the frequency of said radio-frequency current to be applied to said piezoelectric device of said varifocal lens.

2. The laser processing apparatus according to claim 1, wherein said varifocal lens includes a first varifocal lens and a second varifocal lens arranged in series on the same optical axis, each of said first and second varifocal lenses having a piezoelectric device, and said controller controls said radio-frequency current frequency adjuster so as to produce a phase difference of 180° between a radio-frequency current to be applied to said piezoelectric device of said first varifocal lens and a radio-frequency current to be applied to said piezoelectric device of said second varifocal lens.

* * * * *